United States Patent [19]
Codina

[11] 3,827,810
[45] Aug. 6, 1974

[54] OPTICAL MONITOR
[75] Inventor: Jorge G. Codina, Hartsdale, N.Y.
[73] Assignee: Combined Sciences Corporation
[22] Filed: Jan. 8, 1973
[21] Appl. No.: 321,960

[52] U.S. Cl. .................................. 356/201, 356/181
[51] Int. Cl. ............................................ G01n 21/26
[58] Field of Search ........... 356/201, 202, 207, 180; 250/337

[56] References Cited
UNITED STATES PATENTS
3,464,773  9/1969  Waz .................................... 356/215
3,531,209  9/1970  Williamson et al. ................. 356/180

Primary Examiner—Ronald L. Wibert
Assistant Examiner—Matthew W. Koren

[57] ABSTRACT

An optical monitor in which liquid to be analyzed flows through a light transparent cell. First means passes a light beam of selected bandwidth through the cell, the beam being attenuated to an extent dependent upon the light absorption characteristic of the liquid. A photocell device is responsive to the attenuated beam, the resistance of the device varying with the amount of attenuation. An oscillator is coupled to the device to produce an attenuating signal, the signal frequency varying with changes in the resistance of the device whereby the frequency is a measure of the characteristic.

5 Claims, 2 Drawing Figures

PATENTED AUG 6 1974  3,827,810

OPTICAL MONITOR

SUMMARY OF THE INVENTION

In my copending application entitled "Fraction Electronic Collector" filed Dec. 21, 1972, Serial Number 317,289, there is disclosed apparatus for fractionating liquids wherein an optical monitor is used to produce an electrical signal which provides a measure of the absorption characteristic of liquid being fractionated. While known monitors can be used for this purpose, I have invented a new type of optical monitor characterized by reduced size and cost and increased reliability as well as simplified operation.

In my invention, an analog and/or digital electrical signal is produced which is a measure of the absorption characteristic of the liquid being fractionated. To this end, a beam of light of selected bandwidth is passed through a light transparent cell. The liquid flows through the cell. As the beam passes through the cell it is attenuated, the amount of attenuation being dependent upon the light absorption characteristic of the liquid. This characteristic in turn can be used to uniquely identify compounds being fractionated, since each compound has a different characteristic.

The attenuated beam is directed upon a photocell device whereby the resistance of the device depends upon the degree of attenuation. An oscillator producing an alternating signal uses the resistance of the device as a frequency determining element whereby the frequency of the signal is determined by the absorption characteristic.

The signal is then processed to provide digital and/or analog electrical signals which provide measures of the absorption characteristic. In the digital application, a pulse train is produced wherein the number of pulses during a selected interval provide the desired measure. In the analog application, the pulse train is integrated whereby the voltage level provides the desired measure.

DETAILED DESCRIPTION OF PREFERRED EMBODIMENTS

Figure 1:
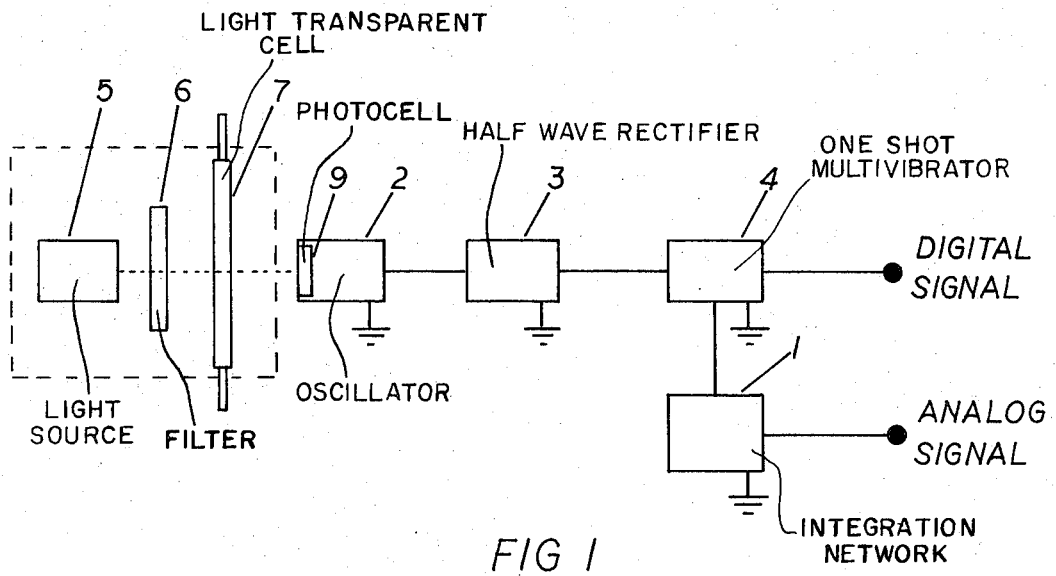
FIG. 1 is a block diagram of my invention.
Figure 2:
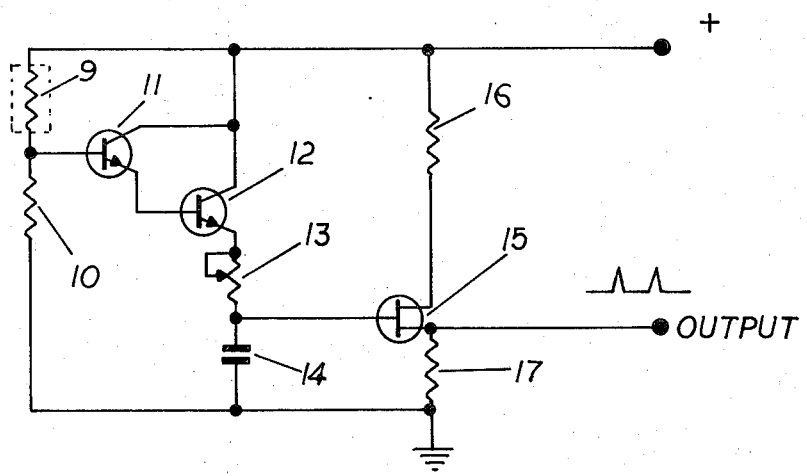
FIG. 2 is a schematic diagram of one of the blocks shown in FIG. 1.

Referring now to FIGS. 1 and 2, liquid to be analyzed flows through light transparent cell 7. A light source 5 with the proper spectral characteristic transmits a beam of light through filter 6 of suitable bandwidth and through the cell onto photocell 9.

Photocell 9 is connected as a variable resistance element in oscillator 2 to determine the frequency of oscillation and thus to vary the frequency of the alternating signal produced by the oscillator.

The resistance of photocell 9 is determined by the amount of light impinging thereon whereby the resistance varies with the amount of attenuation.

The attenuating signal is passed through half wave rectifier 3 whereby a train of half wave impulses is produced.

This train is supplied to a one shot multivibrator 4 whereby a train of pulses is produced, these being one pulse for each impulse. The number of pulses produced during a selected time interval varies with the absorption characteristic whereby the desired digital signal is obtained.

The train of pulses can also be supplied to integration network 1 whereby an analog equivalent to the digital signal is produced.

As shown in more detail in FIG. 2, cell 9 controls the bias, in conjunction with resistor 10 to transistors 11 and 12. As the resistance of cell 9 changes, the current through these transistors changes. This change in current as utilized by potentiometer 13 and capacitor 14 will change the frequency of the oscillating element, uni-junction transistor 15.

I claim:

1. An optical monitor comprising:
   a light transparent cell through which liquid to be analyzed flows;
   first means to pass a beam of light of selected bandwidth through said cell, said beam being attenuated to an extent dependent upon the light absorption characteristic of said liquid;
   a photocell device responsive to the attenuated beam, the resistance of said device varying with the amount of attenuation;
   an oscillator coupled to said device to produce an alternating signal, the frequency of said signal varying with changes in resistance of the device whereby the frequency is a measure of said characteristic; and
   second means coupled to the output of the oscillator to rectify said signal and produce a train of half wave impulses.

2. The monitor of claim 1 further including third means responsive to said impulses to produce a train of unidirectional pulses therefrom, each successive pulse corresponding to each successive impulse.

3. The monitor of claim 2 further including fourth means to integrate said pulse train.

4. The monitor of claim 3 wherein said first means includes a light source.

5. The monitor of claim 4 wherein said first means includes an optical filter disposed between the source and the cell.

* * * * *